(12) United States Patent
Maffeis

(10) Patent No.: US 7,543,991 B2
(45) Date of Patent: Jun. 9, 2009

(54) RECIRCULATING LINEAR BALL BEARINGS

(75) Inventor: Giuseppe Maffeis, Roncadelle (IT)

(73) Assignee: GIMATIC S.p.A., Roncadelle (Brescia) (IT)

( * ) Notice: Subject to any disclaimer, the term of this patent is extended or adjusted under 35 U.S.C. 154(b) by 785 days.

(21) Appl. No.: 11/150,930

(22) Filed: Jun. 13, 2005

(65) Prior Publication Data

US 2005/0271310 A1     Dec. 8, 2005

(30) Foreign Application Priority Data

Jun. 8, 2004    (IT)    ................. BS2004000040 U

(51) Int. Cl.
*F16C 29/06* (2006.01)
(52) U.S. Cl. ...................................................... 384/45
(58) Field of Classification Search ............... 74/43–45;
F16C 29/06; F16H 55/17
See application file for complete search history.

(56) References Cited

U.S. PATENT DOCUMENTS

| | | | | |
|---|---|---|---|---|
| 3,304,133 A * | 2/1967 | Strassberg | .................... | 384/44 |
| 3,467,447 A * | 9/1969 | Newman | ...................... | 384/45 |
| 3,758,176 A * | 9/1973 | Stapley | ........................ | 384/44 |
| 3,845,993 A * | 11/1974 | Schiler | ......................... | 384/45 |
| 4,557,530 A * | 12/1985 | Haase | ........................... | 384/45 |
| 4,701,057 A * | 10/1987 | Kashiwabara | ................ | 384/45 |
| 4,869,600 A * | 9/1989 | Tonogai | ....................... | 384/43 |
| 4,917,508 A * | 4/1990 | Mottate | ....................... | 384/45 |
| 4,927,273 A * | 5/1990 | Mottate | ....................... | 384/45 |
| 5,082,374 A * | 1/1992 | Narumiya | .................... | 384/45 |
| 5,104,238 A * | 4/1992 | Kasai | ........................... | 384/45 |
| 5,281,030 A * | 1/1994 | Krnac | ........................... | 384/44 |
| 5,911,509 A * | 6/1999 | Kawaguchi et al. | ........... | 384/45 |
| 6,435,051 B1* | 8/2002 | Joo | ............................... | 74/436 |
| 6,619,844 B1* | 9/2003 | Baalmann et al. | ............. | 384/43 |
| 6,957,916 B2* | 10/2005 | Fujimura | ...................... | 384/45 |
| 7,008,107 B2* | 3/2006 | Kuwabara | ..................... | 384/45 |
| 7,229,212 B2* | 6/2007 | Takeuchi | ...................... | 384/45 |

* cited by examiner

*Primary Examiner*—Richard WL Ridley
*Assistant Examiner*—Phillip Johnson
(74) *Attorney, Agent, or Firm*—McGlew and Tuttle, P.C.

(57) ABSTRACT

A recirculating linear ball bearing is disclosed which comprises a central metal body (11) and two facing shells (12) of synthetic material, enclosing the central body, and forming with the latter and endless race for recirculating of a number of balls (13); the two shell are fixed together by two screws (13), positioned in parallel and facing in the same direction from opposite sides of the central body.

6 Claims, 1 Drawing Sheet

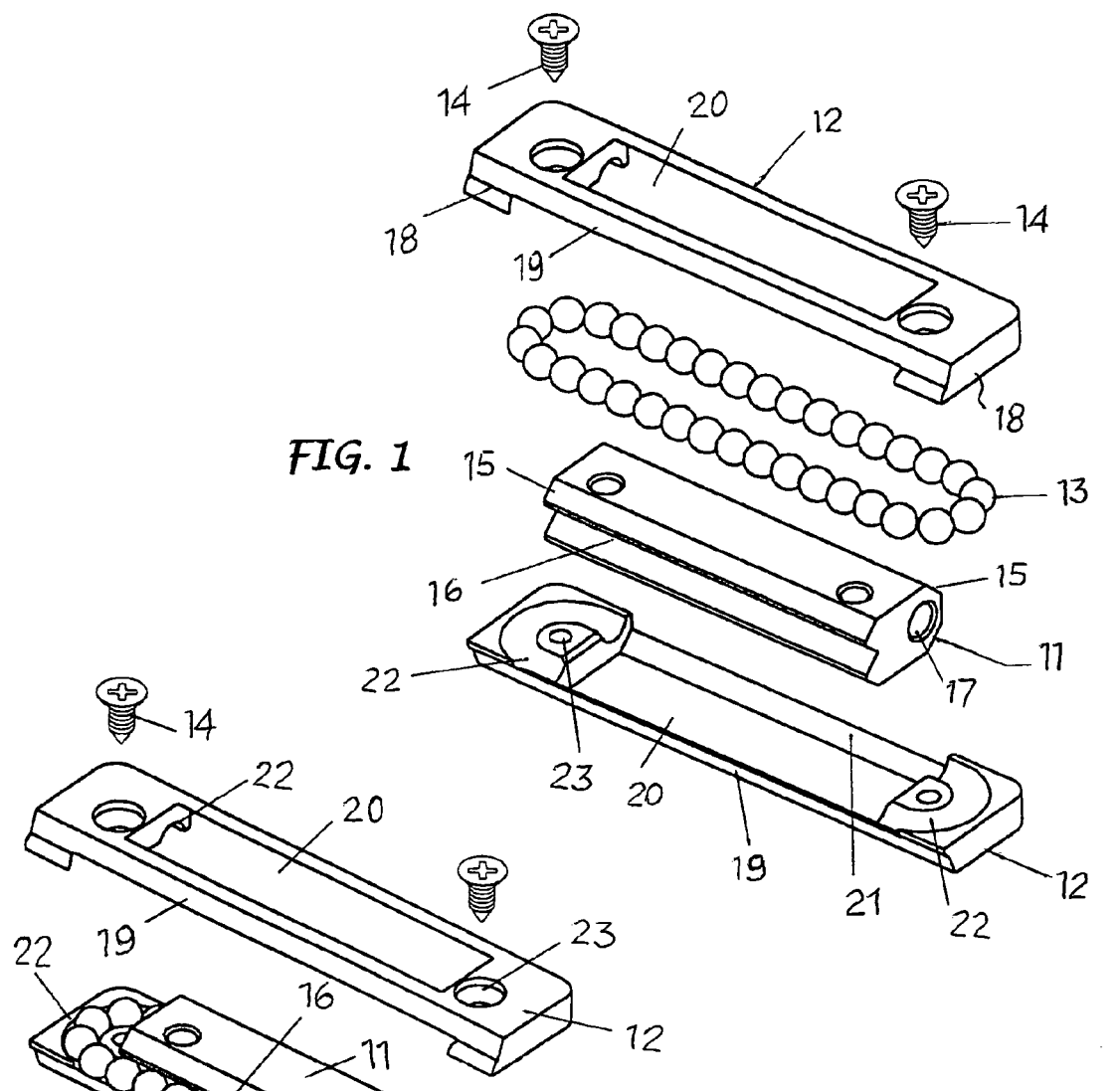
FIG. 1
FIG. 2
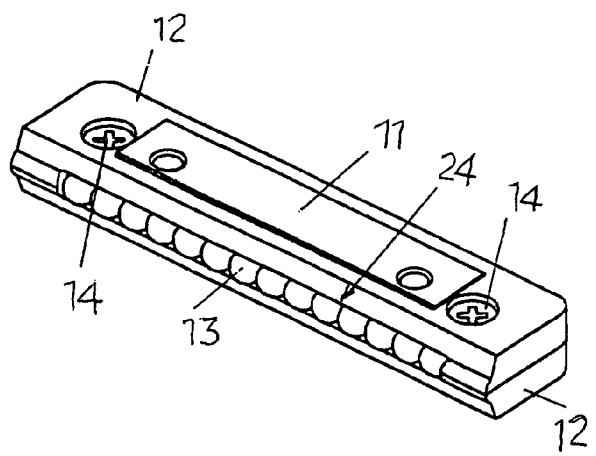
FIG. 3

RECIRCULATING LINEAR BALL BEARINGS

FIELD OF THE INVENTION

This invention concerns a recirculating linear ball bearing with a cartridge like configuration and assembly.

PRIOR ART

The recirculating linear ball bearings taken into consideration are already well known and can be widely used in various fields to support and guide a member which is translatable in respect of another. According to their traditional way of being manufactured they are however relatively complicated and costly to produce and complete. In fact, they are usually made up of a number of longitudinal and head elements, which firstly have to be shaped to define the race for a number of bearing ball and then manipulated, combined and engaged using means of fixing in several directions.

OBJECTS AND SUMMARY OF THE INVENTION

One object of this invention is to provide a recirculating linear ball bearing made up of a limited number of easy and rapid to assemble components, besides being reliable when used.

A further object of the invention is to provide a recirculating linear ball bearing comprising basically only three components, excluding the bearings ball, which can be easily associated in a sandwich arrangement and fixed together as a pack by means of a pair of screws facing in one direction and, therefore, without having to change its orientation several times during assembly.

Said objects and the implicit advantages arising from this, are reached, according to the invention, in a recirculating linear ball bearing comprising a central metal body and two facing synthetic material shells, enclosing the central body, forming with the latter an endless race for receiving and recirculating a number of bearing ball and fixed together by two screws positioned in parallel and facing in the same direction.

BRIEF DESCRIPTION OF THE DRAWINGS

Further details of this invention will become more evident in the continuation of this specification made in reference to the enclosed indicative and not limiting drawings, in which:

FIG. 1 is an exploded view of the components making up the ball bearing;

FIG. 2 is a view in perspective of the ball bearing in an intermediate assembly stage; and FIG. 3 shows an ball bearing as assembled.

DETAILED DESCRIPTION OF THE INVENTION

As shown, the ball bearing of the invention comprises a central linear body 11, two facing shells 12, a number of bearings ball 13 and two anchoring screws 14.

The central linear body 11 is preferably made of a metal such as steel, parallelepiped shaped and formed with bevelling 15 along its longitudinal edges. Along one longitudinal side it has a V or trapezoidal groove 16 and, adjacent to the opposite longitudinal side, a through bore 17, on the same plane and parallel to said groove.

The two shells 12 can be moulded using a synthetic material. Each one has two end portions 18 connected by a pair of parallel cross pieces 19, in order to form a window between them and said end portions 18. The cross pieces 19 have an internal side with a bevelled surface 21 to match the bevelling 15 along the longitudinal edges of the central body 11.

On the internal face of each end portion of each shell 12 is an arch shaped connection recess 22, almost semicircular, that after assembling of the shells 12 to the central body 11, are on a plane with the groove 16 and through bore 17 of said body, joined together to form an endless race.

In each end portion 18 of each shell 12 a bore 23 is provided to receive the anchoring screws 14.

The bearing is assembled by positioning the central body i 1 inside the window 20 of a first shell 12, then setting the bearing balls 14 in the race formed by the groove 16 and the bore 17 of said body with the arch shaped connection recesses 21 of said first shell, placing the other shell 12 on top and blocking the two shells together using the screws 14, assembled in the same direction, to enclose the central body 11 and the bearing balls 13 as shown in FIGS. 2 and 3.

Important is the fact that the two opposite faces of the central body 11 in the parallel planes to the race for the bearing balls protude towards the outside through the windows 20 formed in each shell 12. On the other hand, the cross pieces 19 of the two shells 12, after being assembled, are spaced in height, forming on one side, a first opening 24 enabling the balls 13, which are in the groove 16 of the central body, to protrude externally, and on the opposite side, a second opening towards the outside of the face of the central body adjacent to the through hole ball guide 17 of the balls. In this way, when the bearing is being used, all its parts in contact with the members to be guided are of metal, and the side of the central body adjacent to the through guide bore 17 can form a reference surface to adjust the position of the bearing operating.

The invention claimed is:

1. A recirculating linear ball bearing, comprising:
a central metal body; and
two facing shells of synthetic material, said two facing shells enclosing said central body, said two facing shells and said central body forming an endless race for recirculating a number of bearing balls, one of said facing shells being fixed to another of said facing shells by two screws, one screw being placed parallel to another screw, said two screws facing in the same direction, wherein said central body has edges extending in a longitudinal direction thereof, said central body having beveling along said longitudinal edges, said central body having a V or trapezoidal groove on one longitudinal side thereof, said central body having a through bore located adjacent to another longitudinal side, said another longitudinal side being located opposite said one longitudinal side, wherein each shell has two end portions connected by parallel cross pieces, each of said end portions having an arch shaped connection recess on an internal face thereof, said arch shaped connection recess connecting the groove and the through bore of said central body when one of said shells is fixed to another of said shells such that an endless race is formed.

2. A recirculating linear ball bearing according to claim 1, wherein each shell has cross pieces and end portions, said cross pieces of each shell having an internal side with a beveled surface corresponding to said beveling along the longitudinal edges of the central body, said cross pieces and the end portions of each shell forming a window through which a corresponding face of said central body protrudes towards the outside.

3. A recirculating linear ball bearing according to claim 2, wherein the cross pieces of the two shells when assembled are spaced and form, on one side, a first opening through which the bearing balls protrude externally in correspondence with the groove of the central body and, from the opposite side, a second opening towards the outside of the face of the central body adjacent to the through bore in which the bearing balls are moving.

4. A recirculating linear ball bearing, comprising:

a central metal body; and two facing shells of synthetic material, said two facing shells enclosing said central body, said two facing shells and said central body forming an endless race for recirculating a number of bearing balls, one of said facing shells being fixed to another of said facing shells by two screws, one screw being placed parallel to another screw, said two screws facing in the same direction, wherein each shell has cross pieces and end portions, said cross pieces of each shell having an internal side with a beveled surface corresponding to a beveling along the longitudinal edges of the central body, said cross pieces and the end portions of each shell forming a window through which a corresponding face of said central body protrudes towards the outside.

5. A recirculating linear ball bearing, comprising:

a central metal body; and two facing shells of synthetic material, said two facing shells enclosing said central body, said two facing shells and said central body forming an endless race for recirculating a number of bearing balls, one of said facing shells being fixable to another of said facing shells by two screws, one screw being placed parallel to another screw, said two screws facing in the same direction, wherein each shell has cross pieces and end portions, said cross pieces of each shell having an internal side with a beveled surface corresponding to a beveling along the longitudinal edges of the central body, said cross pieces and the end portions of each shell forming a window through which a corresponding face of said central body protrudes towards the outside, wherein the cross pieces of the two shells when assembled are spaced apart and form, on one side, a first opening through which the bearing balls protrude externally in correspondence with the groove of the central body and, from the opposite side, a second opening towards the outside of the face of the central body adjacent to the through bore in which the bearing balls are moving.

6. A recirculating linear ball bearing, comprising:

a central metal body; and two facing shells of synthetic material, said two facing shells enclosing said central body, said two facing shells and said central body forming an endless race for recirculating a number of bearing balls, one of said facing shells being fixed to another of said facing shells by two screws, one screw being placed parallel to another screw, said two screws facing in the same direction, wherein said central body has edges extending in a longitudinal direction thereof, said central body having beveling along said longitudinal edges, said central body having a V or trapezoidal groove on one longitudinal side thereof, said central body having a through bore located adjacent to another longitudinal side, said another longitudinal side being located opposite said one longitudinal side, wherein each shell has two end portions connected by parallel cross pieces, each of said end portions having an arch shaped connection recess on an internal face thereof, said arch shaped connection recess connecting the groove and the through bore of said central body when one of said shells is fixed to another of said shells such that an endless race is formed, wherein the cross pieces of each shell have an internal side with a beveled surface corresponding to said beveling along the longitudinal edges of the central body, said cross pieces and said end portions of each shell forming a window through which a corresponding face of the central body protrudes towards the outside.

* * * * *